Patented Nov. 29, 1927.

1,650,867

UNITED STATES PATENT OFFICE.

FRED W. FISCHER AND GRANVIL F. DALLAS, OF KNOXVILLE, TENNESSEE, ASSIGNORS TO TENNESSEE TOOL WORKS, INC., OF KNOXVILLE, TENNESSEE, A CORPORATION OF TENNESSEE.

COMPOSITION FOR SEALING LEAKS IN TIRES AND TUBES AND PROCESS FOR ITS PRODUCTION.

No Drawing.   Application filed March 8, 1927.   Serial No. 173,783.

This invention relates to that general class of compositions, preparations, or compounds intended for use inside of the inner tube of a pneumatic tire and designed to seal any opening in the tube casing caused by puncture, pinching, chafing, and like causes, and to processes for their production.

Many compositions or compounds have been devised which are adapted to be forced inside of the inner tube through the air valve, having for their purpose the closing of punctures and leaks but, so far as we are aware, no composition or compound heretofore provided has been satisfactory in every respect.

The object of our invention is to provide a composition or compound for the purpose set forth, which will be harmless to handle, substantially non-inflammable, contains no acid or alkali which might be injurious to the tube or tire or to clothing or to any material or the human body, or contains any oily matter which would be injurious to rubber or which will become gummy or mucilaginous or cause the tube to stick to the tire or clog up the tire valve and cause it to be inoperative.

On the contrary, our new composition or compound is harmless to the rubber fabric of the tube and tire, cannot injure the clothing or the skin or flesh of persons who may come in contact with it, is practically free of fire hazard as it contains no highly inflammable substance, embodies no strong acid or alkali nor any oily matter injurious to rubber, does not evaporate or harden when not in use, contains no gritty or abrasive substance to injure the valve or the tube or tire, is of light density and adapted for easy injection into the inner tube through the air valve, will maintain a liquid consistency for a period equal to that of the effective life of a tube or tire, and does not injuriously affect any patch, whether vulcanized or cemented, which may be on the tube before the compound is applied thereto.

Our compound is easy to produce and can be made at extremely low cost and is very effective in its sealing action even though the object which may pentrate the tire or tube is relatively large and though the punctures may be numerous, as shown by many tests we have made, certain ones of which are hereinafter set forth.

Our compound is produced by a special novel process, the particulars of which are set forth hereinafter.

We do not wish to be understood as claiming that our composition will prevent blowouts, rim cuts, or other extraordinary injuries arising from inherent defects or weakness in tires although we have observed that the compound may be adapted to prevent rapid deflation when such rim cuts occur.

An example of our compound or composition is as follows:

|  | Per cent. |
|---|---|
| Water | 70 |
| Cooked flax seed meal | 11.7 |
| Raw linseed oil | 11.7 |
| Dissolved uncured rubber gum | 5.9 |
| Soda bicarbonate | .7 |
|  | 100.0 |

To the foregoing ingredients there may be added, if desired, silicate of soda which may be in the proportion of 5.9 per cent.

In compounding the ingredients, the water is brought to the boiling point in a suitable double boiler or steam jacketed kettle. Flax seed meal is then added slowly to the boiling water to avoid formation of lumps, while the mixture is slowly stirred and such stirring is continued, while the water is kept at the boiling point for a period of approximately one half hour.

The boiling is then ceased and the raw linseed oil is immediately added to the mixture of water and flax seed meal and the mixture of water, flax seed meal, and linseed oil is slowly stirred until the temperature drops to about 160 degrees Fahrenheit. At this point, the soda bicarbonate is slowly added to the foregoing mixture, the contents meanwhile being continuously stirred.

When the mixture has cooled to a temperature of about 120 degrees F., the dissolved uncured rubber gum is added and the mixture is stirred until it has cooled thoroughly, releasing all solvent through evaporation. Before the solvent has been entirely dissipated, the rubber content will have been evenly distributed throughout the entire mixture and tends to lightly coat each particle of flax seed meal with rubber.

When the mixture is cooled it will be in a semi-fluid state and it can then be put up in suitable containers for subsequent use.

In our composition water is the cooking and carrier agent. The linseed oil prevents evaporation and preserves or softens the rubber. The flax seed meal supplies body to the compound. The uncured rubber gum coats the particles of flax seed meal. The soda bicarbonate prevents the mixture from souring. If silicate of soda be used, it tends to harden the body of the mixture. When silicate of soda is employed, it is added to the mixture after the mixture has cooled.

All of the operations involved in the preparation of our compound should take place in closed vessels to prevent evaporation of essential oils, except that the cooking vessels must be open to the atmosphere when, and after, adding the dissolved uncured rubber gum, the purpose in that respect being to provide for the escape of the solvent of the dissolved uncured rubber gum. Such solvent has usually been naptha, benzine, or high-test gasoline and, of course, this solvent has to be driven off.

Our new composition or compound being in a semi-fluid condition, it is used by injecting it through the air valve of the inner tube of the tire. After the tire has been revolved, the inner surface of the inner tube will be coated with the compound so that any punctures will be instantly sealed when the cause of the puncture has been removed.

Our composition remains in a semi-fluid condition as long as it is contained within the tube of the tire.

We have made the following tests of our compound:

*Test No. 1.*—Three pints of the composition were injected into a new 30 x 3½ tube which was placed in an old tire casing of a Ford car and inflatted to forty-five lbs. pressure. The car was driven daily in usual service for a period of seven months without loss of air pressure although seven punctures were noted when the tube was removed from the tire, three of the punctures apparently being from tacks and the balance from nails.

The tube did not stick to the tire and was easily removed. The compound was removed from the tube by rolling the tube together and forcing the compound through the air valve from which the insides had been removed. The total amount of compound recovered was ninety-seven per cent of the total amount originally injected and was found to be of about the same density as when first applied.

The tube was cut into sections, some of which were split lengthwise for examination and at no point had the compound penetrated the talcum coating which had been placed on the inside of the tire by the manufacturer. The compound adhering to the inside of the tube was easily scraped off. The density, color, and odor of the compound was practically the same as when first injected into the tube.

*Test No. 2.*—One quart of our compound was injected into each of two 33 x 4½ tubes containing a number of cold patches and hot vulcanized patches, the tubes being placed in tires inflated to sixty lbs.

Sixteen nails, ranging from six-penny to twenty-penny size were driven through a board and the board spiked down to an asphalt pavement. The automobile having the tires was driven slowly so that both tires containing our compound would pass over the nails and become punctured. A noticeable slackening of speed occurred when the tires pulled away from the nails. The car was then speeded up and ran about a quarter of a mile. The tires were again punctured in the same manner except at a higher rate of speed, about fifteen miles per hour.

The tires used in this test were in poor condition, very little rubber remaining at the tread center. The tires were driven for thirteen weeks after the test without noticeable loss of air but the thinness of the tires then caused blow-outs when driving at a high rate of speed. The compound which remained in the tubes of these tires showed no appreciable change nor was there any weakening of any of the patches of both types which were on the tubes. After repairing the blow-outs the tubes were again placed in service without repairing the punctures and when put in use continued to give good service.

*Test No. 3.*—Our compound was injected into tire tubes which had become so porous from age that daily inflation had been required. After applying our compound, all leaks were closed and the tubes continued to give good service. These tubes had none of the resilient qualities found in new rubber when our compound was applied to them; without the use of our compound they would have had to be discarded.

*Test No. 4.*—Our compound has been used in many cases on cars making long tours. Some of these tours were from Knoxville, Tennessee to San Antonio, Texas and return. Other runs with the tires on the wheels of the car were from Knoxville, Tennessee to Miami, Florida and return. In each instance there was no loss of air from puncture except that in one instance there was a slight leakage where a Ford rim bolt which apparently had entered the tube before our compound was used, was found in a tire.

*Test No. 5.*—Demonstration of tires containing our compound have been punctured as many as two hundred times with very little loss of air, a loss too small to be noted by a standard tire pressure gauge. In many instances tubes were deliberately punctured many times, then placed in the tire, our compound injected into the tube, the tire pumped, and then continued to be used in actual service.

*Test No. 6.*—The ordinary single tube bicycle tires were treated with our compound, about four ozs. of the compound being injected in each tube. The tubes were repeatedly punctured with an ice pick. These tires were operated on bicycles of messengers for Western Union to insure hard service. It was noted that about one drop of the compound leaked through each puncture on a single tube tire before the leak was closed. The tires thus treated did not lose pressure.

*Test No. 7.*—Our compound has been used in the tires of about one hundred automobiles for test purposes and, except in one instance, splendid service has been obtained and no complaints have been submitted. In the case of the exception, there was an old blown-out tire which the owner claimed was caused by the pressure of our fluid hereinbefore described. Inasmuch as our compound does not generate gas, we considered that the blow-out was due to overinflation.

*Test No. 8.*—This very unusual test of our compound was as follows: A 30 x 3½ tire containing one and one-half pints of our compound was inflated to forty lbs. pressure and caused to roll along on a floor. While in motion, five bullets were fired in succession from a thirty-eight calibre revolver into the tire. Four of the bullets went completely through both side walls of the tire. The fifth bullet went through the tire but flattened itself on the edge of the rim. Our compound instantly sealed all of the openings made by the bullets. The tire was regularly inspected for three weeks after this test without any loss of air being noted and then the tire suddenly deflated from some cause not known. Upon re-inflating the tire, however, no further loss of air was noted and when the tube was removed from the tire, about four months later, the tube did not stick at any point to the tire.

In our composition a new result is obtained, in that the rubber content of the uncured rubber gum coats the particles of flax seed meal, thus providing rubberized particles which are adapted to effectively close for long periods any leak or puncture when the composition is applied, since their coating causes them to resist the wearing away of the fiber or meal-particles due to the constant attrition to which they are subject inside a tire-tube which is in use.

What we claim is:

1. A composition for sealing leaks, comprising a semi-liquid mixture of flax seed meal and uncured rubber gum softened with linseed oil.

2. A composition for sealing leaks, comprising a semi-liquid mixture of flax seed meal and uncured rubber gum softened with linseed oil, and a preservative.

3. A composition for sealing leaks, comprising a semi-liquid mixture of flax seed meal and uncured rubber gum softened with linseed oil, and bicarbonate of soda.

4. A composition for sealing leaks, comprising a semi-liquid mixture of flax seed meal and uncured rubber gum softened with linseed oil, a preservative, and silicate of soda.

5. A composition for sealing leaks, comprising a semi-liquid mixture of flax seed meal and uncured rubber gum softened with linseed oil, bicarbonate of soda, and silicate of soda.

6. The process of producing a fluid composition for sealing leaks, which consists in adding flax seed meal to a liquid while under heat treatment, thereupon adding raw linseed oil to the solution, then adding a preservative to the solution, and then adding uncured rubber gum to the mixture.

7. The process of producing a fluid composition for sealing leaks in tires and tubes, which consists in adding flax seed meal to a boiling liquid while stirring the mixture, thereupon mixing raw linseed oil in the solution while stirring it, then adding a preservative to the mixture, and, when the mixture is at a temperature well below the boiling point, adding thereto uncured rubber gum while stirring the mixture, thereby to cause the rubber content to lightly coat the particles of flax seed meal in the mixture.

In testimony whereof we affix our signatures.

FRED W. FISCHER.
GRANVIL F. DALLAS.